United States Patent [19]

Severson

[11] 4,450,504
[45] May 22, 1984

[54] METER TAMPERING INDICATOR

[75] Inventor: Asbjorn M. Severson, Minneapolis, Minn.

[73] Assignee: Honeywell Inc., Minneapolis, Minn.

[21] Appl. No.: 429,346

[22] Filed: Sep. 30, 1982

[51] Int. Cl.³ .............................................. H02B 9/00
[52] U.S. Cl. .................................... 361/369; 361/364; 324/110; 206/459
[58] Field of Search ................ 206/459, 807; 361/364, 361/369–371; 324/110, 156; 116/307; 220/214

[56] References Cited

U.S. PATENT DOCUMENTS 2,914,354  11/1959  Moberg ............................... 292/307

Primary Examiner—G. P. Tolin
Attorney, Agent, or Firm—Charles G. Mersereau

[57] ABSTRACT

A mechanical apparatus for indicating watthour meter tampering of a typical single phase induction watthour meter which includes a base member, a plug-in mechanism mounting member and a cover glass fixed to the mechanism mounting member. The device includes an easily rupturable, normally glass, container juxtaposed the mechanism mounting member of the watthour meter and fixed through said mounting member to the meter base in a manner such that attempts to unplug the mounting member from the base will cause said container to rupture and thereby indicate meter tampering. The container may also be mounted next to the cover glass of the watthour meter and adhesively connected thereto in a manner such that movement of the cover glass relative to the mechanism mounting member results in the rupture of the container. The container may be filled with a staining colored liquid to more readily indicate breakage and it may be made sensitive enough to rupture in case of an external blow to the meter sufficient to cause change in mechanism function.

6 Claims, 3 Drawing Figures

METER TAMPERING INDICATOR

BACKGROUND OF THE INVENTION

1. Field of the Invention

The present invention relates generally to devices to prevent or hinder tampering with electric watthour meters and, in particular, an indicating device in which removal of the meter from the socket or the cover from the meter is permanently indicated by the breakage of a glass vial containing a dye material.

2. Description of the Prior Art

The use of induction type watthour meters installed in meter sockets at customers' sites is well known in the electric utility metering field. Total electrical energy consumption is indicated on one or more register dials on the watthour meter which are driven by a geared disk which, in turn, is driven by a shunt induction motor. This system continually increments the dial or dials to show total electrical energy use. The dial or dials are read periodically for the purposes of billing by utility companies. Thus, the dial on the electric watthour meter is normally the only check which the utility company has pertaining to the total electric energy consumption by a particular customer. This had led to wide-spread tampering of watthour meters in an effort to reduce the indicated consumption and thereby defraud the utility company through indication of less-than-actual power consumption. The Edison Electric Institute (EEI) estimates that the total United States utility industry loses more than four hundred million dollars annually to meter cheaters. Other estimates by utility experts run as high as two billion dollars annually.

A large share of the meter tampering is done by residential and commercial customers with single phase induction watthour meters. Of the more than twenty-five commonly detected methods of meter tampering, more than two-thirds of these require either removal of the meter from its socket or removal of the cover glass.

One well known method of meter tampering involves removal of the meter from its socket and reinstallation of the meter in an upside down position so that the terminals are reversed and the meter registers are caused to run in reverse, thereby reducing the total indicated power consumption without interruption of the power supply to the user. Other popular methods include delivering a blow to the meter such that the induction drive system is permanently disturbed and the mechanism runs at a slower rate for a given amount of power throughput, and using an external magnet to slow or even stop the operation of the induction disk drive system. In some cases the glass is removed and the dial readings changed or the operation of the mechanism otherwise interfered with to affect the meter reading. In a publication entitled "Meter Tampering Report" published in June 1978 by Texas Electric Cooperatives, Inc. it is estimated that the above overt methods account for about 85% of the total meter tamperings. Other, more subtle, methods account for the remainder.

One clever prior art approach to the problem associated with reinserting the meter upside down is disclosed in U.S. Pat. No. 4,039,943 issued Aug. 2, 1977. If the meter is equipped with a gravity switch which together with an auxiliary magnet cooperates to not only to cause the meter to operate in the forward direction when installed upside down, but also causes it to run at a greater rate than that indicated by the actual power consumed, thereby penalizing the defrauder.

Various other schemes and devices have also been utilized in an attempt to stop the other common methods of defrauding the power company. However, there remains a definite need for a type of device which is low cost, easy to install and prevents most or all of the most common methods of meter cheating.

SUMMARY OF THE INVENTION

In accordance with the present invention there is provided a simple mechanical device which serves to indicate the removal of the meter from the socket, the removal of the glass cover from the mechanism support member or the occurrence of external impacts in excess of a threshold level. A vial of glass or other easily ruptured material is secured through the mechanism support member to the meter base at the time the meter is installed in a manner such that the meter cannot thereafter be removed without breaking the vial in the absence of special tools. In additional the vial may be located in a position such that one end of the vial may be adhesively connected to the cover glass such that removal of the cover glass also causes the vial to break. The vial may be filled with a colored fluid which creates a stain on the inside of the cover glass should the vial be broken for any reason. In addition, the vial can be made thin enough such that a shock caused by an external blow to the meter will also cause the vial to rupture thereby letting out the colored fluid.

In the preferred embodiment a hole in the meter base is drilled and tapped and a threaded hollow plug inserted. A coincident hole is drilled in the meter mechanism support member. The vial is then positioned and held in place by a spring device which surrounds the vial and has extensions which expand to hold the vial utilizing the inserted plug in the base much in the same fashion as the wings of a toggle bolt. The vial may also be more firmly positioned by utilizing an additional fastening means attached to the meter mechanism support member. The vial may also be positioned such that one end thereof is adjacent the glass cover. This end may be provided with an adhesive material such that when the glass cover is installed the adhesive will cause the vial to adhere to the cover plate.

BRIEF DESCRIPTION OF THE DRAWINGS

In the drawings wherein like numerals are utilized to designate like parts throughout the same.

DESCRIPTION OF THE PREFERRED EMBODIMENT

Figure 1:
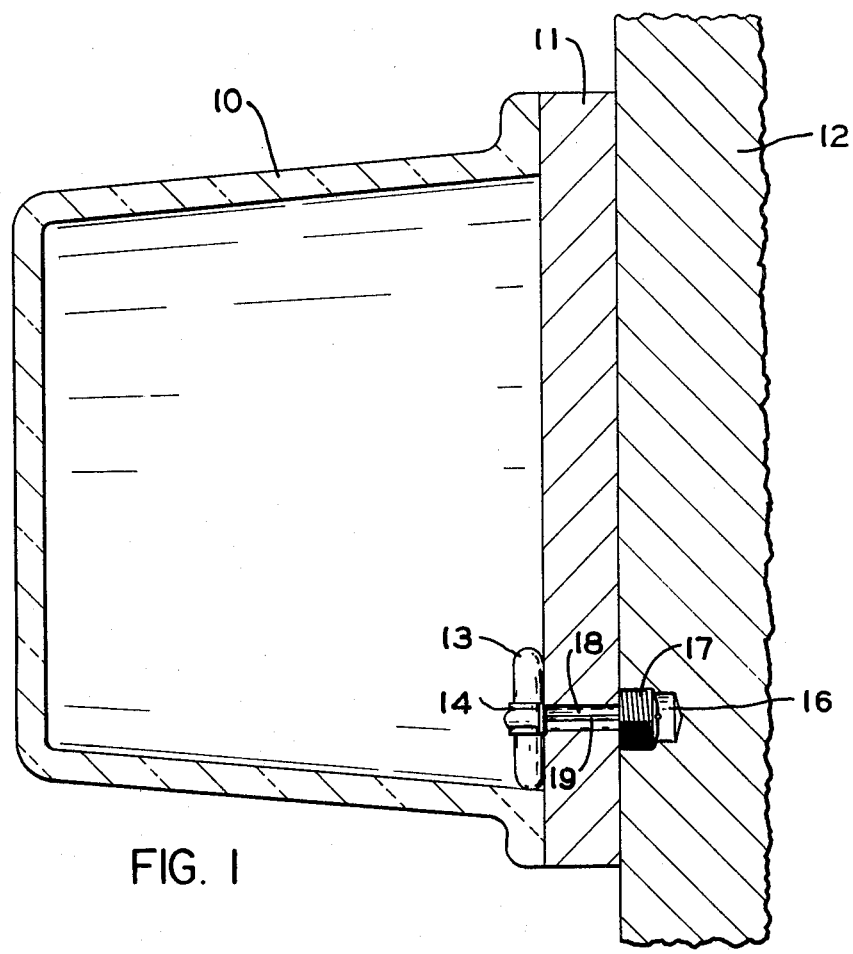
FIG. 1 is a sectional view showing a typical watthour meter configuration with the anti-tampering device of the present invention in place.
Figure 2A:
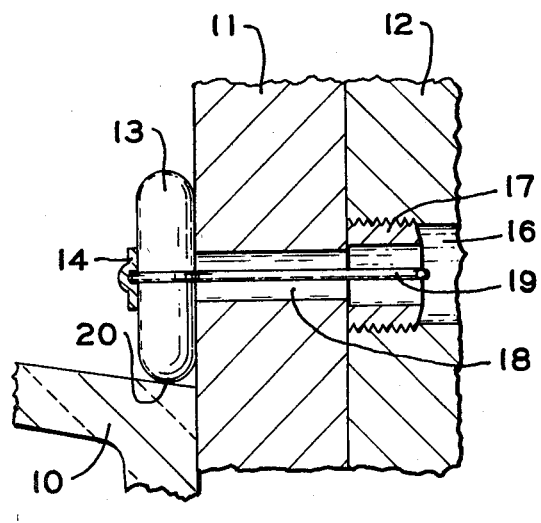
FIGS. 2A and 2B are enlarged, fragmentary detailed views from FIG. 1 showing the fastening of the vial in place, taken 90° apart.
Figure 2B:
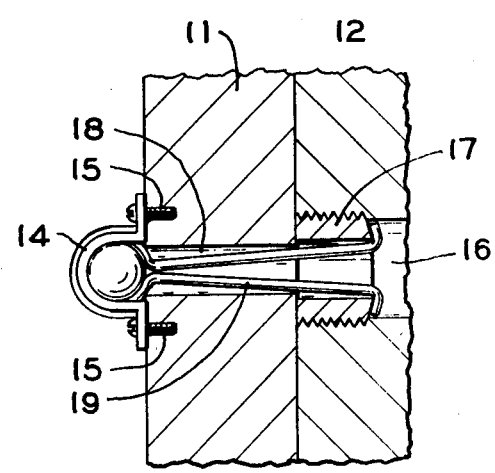

In FIG. 1 there is shown a sectional view through a typical single phase induction watthour meter shown without the meter recording mechanism to more conveniently depict the anti-tampering device of the invention. The meter includes a heavy cover glass 10 attached to the mechanism support member 11 which, in turn, plugs electrically into a permanently mounted base 12 utilizing two electrical plugs (not shown) in a well known fashion. The anti-tampering device of the invention is more clearly depicted in the enlarged fragmentary sectional views of FIGS. 2A and 2B, includes a thin-walled vial 13 normally made of glass or other easily rupturable material which may be filled with colored alcohol or other liquid, the leakage of which will stain the meter so as to be readily detected. The vial 13 may be fixed in juxtaposed position to the member 11 as by a holding member 14 fastened by screws 15. The member 12 is provided with a drilled opening 16 which is tapped and into which a hollow plug 17 may be threaded. An opening 18 is provided in the member 11 to coincide with the opening 16 in the member 12. A spring member such as that depicted at 19 is provided which surrounds the vial 13 and which, when compressed, allows insertion through the opening 16 of member 11 and the opening in the hollow plug member 17 such that when expanded the spring member holds the vial in place utilizing the plug member 17 somewhat in the manner of a toggle bolt, as shown. In addition, the vial 13 may be provided with an adhesive at 20 such that when the cover glass 10 is placed over the meter the adhesive 20 causes the adjacent end of the vial to adhere to the cover glass 10.

It can be seen from the drawings that once the spring 18 has been inserted through the member 11 into the member 16, the member 11 cannot be separated from the member 12 without breakage of the vial. Of course the hollow plug 17 may be provided with an extension which shields the spring at the juncture between the members 11 and 12 to prevent insertion of shims to compress the springs. With the adhesive, of course, the cover glass 10 cannot be removed from the system without likewise breaking the vial and causing the liquid to spill or otherwise discolor the meter. In this manner neither the meter nor the cover glass may be removed, once installed, without destroying the glass vial 13. Insofar as the power company is concerned, a special opening and/or tools may be provided so that the spring 19 can be compressed and the vial removed without the necessity of breaking the vial. In addition, the walls of the vial may be thin enough such that a sharp blow either to the base or to the cover glass will also cause the breakage of the vial and the spilling of the liquid, thus indicating tampering with the meter.

It will readily be appreciated that the device of the present invention provides a low cost, simple mechanical device which detects tampering with electric watthour meters in any way which require removal of the meter, removal of the cover glass, or a sharp blow thereto. In addition, the device of the present invention may be readily installed in an existing meter simply by drilling and tapping the base member 12, drilling the member 11, installing the device utilizing the screws 15 and replacing and sealing the cover glass 10.

The embodiments of the invention in which an exclusive property or right is claimed are defined as follows:

1. An apparatus for indicating watthour meter tampering, said apparatus comprising: a watthour meter having a base member, a plug-in mechanism mounting member and a cover glass fixed to the mechanism mounting member, and wherein an easily rupturable, sealed hollow container is juxtaposed the mechanism mounting member of the watthour meter and fixed through said mounting member to the meter base in a manner such that attempts to unplug the mounting member from the base will cause said sealed hollow container to rupture and thereby indicate meter tampering.

2. An apparatus according to claim 1 wherein said container is further mounted juxtaposed the cover glass of the watthour meter and is adhesively connected thereto in a manner such that movement of the cover glass relative to said mechanism mounting member results in the rupture of said container.

3. The apparatus according to either of claims 1 or 2 wherein said container is filled with a colored liquid to more readily indicate rupture of the container.

4. The apparatus according to either of claims 1 or 2 wherein said container is sufficiently sensitive to rupture in case of an external blow to the meter sufficient to cause change in mechanism function.

5. The apparatus according to claim 3 wherein said container is sufficiently sensitive to rupture in case of an external blow to the meter sufficient to cause change in mechanism function.

6. The apparatus according to claim 1 wherein said container is mounted to said mechanism mounting member utilizing expanding springs to fix said container in said base member.

* * * * *